Patented Dec. 26, 1933

1,941,267

UNITED STATES PATENT OFFICE 1,941,267

TREATMENT OF HYDROCARBON OIL

Jacque C. Morrell, Chicago, Ill., assignor to Universal Oil Products Company, Chicago, Ill., a corporation of South Dakota No Drawing. Application February 18, 1932
Serial No. 593,874

3 Claims. (Cl. 196—36)

This invention relates more particularly to the refining treatment of the relatively low boiling cracked distillates produced by the thermal conversion of high boiling hydrocarbon oil mixtures into lower boiling hydrocarbons suitable for use as motor fuel.

In a more specific sense the invention is concerned with an improved process whereby relatively low boiling hydrocarbons may be treated and refined while in heated vaporous condition either as produced from the fractionators of the cracking plant or when the initially produced distillates or naphthas are redistilled to produce endpoint gasoline.

To produce marketable gasolines from cracked or "pressure" distillates it is practically always necessary to remove all or a major portion of the more highly unsaturated olefinic constituents and also the major portion of the more reactive sulfur compounds, since the former class, even in small percentages, accounts for the gum-forming tendencies of the gasolines and the latter produce the corrosive effects noted upon feed lines, valves, carburetors, et cetera, before the combustion of fuel, and produce oxides of sulfur which cause crankcase corrosion after combustion.

In one specific embodiment the invention comprises the treatment of hydrocarbon oils, particularly cracked hydrocarbon oils, while in heated vaporous condition with reagent mixtures containing sulfuric and acetic acids.

The acids mentioned are substantially miscible in all proportions which have any value as treating agents when used according to the invention. Considering the anhydrous acids, at ordinary temperatures, they are completely miscible except for a very narrow range of concentrations extending either side of a 50% mixture by weight. In other words, solutions of acetic acid in sulfuric may be made up to approximately 40% acetic and 60% sulfuric and inverse mixtures may be made containing 60% acetic and 40% sulfuric acid, the figures given being approximate as the exact percentages will vary with the presence of small amounts of water and the limits of complete miscibility are of no special significance.

Another series of treating mixtures may be made up containing the two acids and water, and in this case the only limitation is the percentage of water which may be employed which, for best results, should not exceed a given concentration under a fixed set of operating conditions, since undue evaporation would result and the treating reagent undergo change to an extent making control of the operations difficult.

In applying the invention to practice, the optimum proportions and concentrations of sulfuric acid, acetic acid and water will be determined best by trial in a majority of instances, since the mutual solubility at the elevated temperatures of the vapors undergoing treatment will be different than at ordinary temperatures, and since the effect of the acid mixtures is not entirely predictable on analytical data. The solutions may be applied to the vapors in any type of treating equipment capable of effecting intimate contact betwen liquids and vapors, such types of equipment including vertical cylindrical treating towers containing various types of filling material such as coarse silica fragments. Raschig rings, crushed firebrick, et cetera, and also similar towers containing regularly spaced trays or baffles. The simplest method of operation is usually to inject the treating solutions into the upper portion of the treating tower through some distributing means such as a spray or atomizer and then allow the liquid to flow downwardly countercurrent to the ascending stream of vapors. A jet mixer has also been found satisfactory. In some instances treatments may be conducted with the reagent and vapors flowing in the same direction, in which case any portions of the vapor which may condense will be subjected to liquid phase treatment.

The spent reagents mixed with reaction products and some unconverted oil may be drawn from the bottom of the treater continuously or intermittently, the oil separated by gravity and the sludge acids subjected to any necessary regenerating steps to permit their cycling to the treater in lieu of fresh materials.

The invention is not limited to the use of any particular temperature and pressure ranges and, while it may be generally stated that temperatures of from 250 to 600° F. and pressures from atmospheric to several hundred pounds per square inch may be employed, it is further comprised within the scope of the invention to vary pressure and temperature independently either by superheating vapors above the temperatures normal to the pressure under which they exist or to use pressures less than atmospheric so that correspondingly low temperatures are available with corresponding modification of the results obtained by the treatment. In all cases the strength of the treating reagent and the conditions of operation will be chosen that are best suited to the efficient treatment of the vapors in question.

The effects produced upon hydrocarbon oil vapors, particularly cracked vapors, are comparable to those produced by ordinary sulfuric acid treatments, and possess the added virtues of having a more selective action upon the di- and tri-olefins in vapor mixtures and of producing desulfurizing effects without removing unduly large percentages of mono-olefins, which are valuable in gasoline on account of their antiknock character.

The process may be employed as a single treatment upon hydrocarbon oil vapors, or it may be used as one step in a series of treating steps, both vapor and liquid phase. For example, the vapors may be contacted with fuller's earth, metal oxides, et cetera, prior to the use of the reagents described and treatment may be followed in turn by neutralizing treatments with caustic alkalis and ammonia or light final treatments upon the condensed vapors.

The corrosive effect of the treating mixtures may be overcome by the use of acid-resisting metals or suitable linings. For example, the treating towers may be lined with silicate mixtures and cements involving the use of water glass, fire clay, et cetera, or they may be lined with various enameling compositions.

A single example of results selected from the many made possible by the use of the invention may be given as illustrative of the value of the process. In treating the vapors of approximate gasoline boiling point range arising from a cracking system operating on an approximately equal mixture of Mid-Continent heavy residuum and gas oil distillates as charging stock, a solution containing approximately 40% sulfuric acid, 50% acetic acid and 10% water may be employed. The vapors from the high pressure fractionator may be reduced to a pressure of 50 pounds per square inch, at which their mean temperature is in the neightborhood of 325–350° F. These vapors may be passed upwardly through a filled tower containing coarse silica fragments with the solution flowing downwardly by gravity. By using an amount of reagent equal to approximately 7 pounds per barrel of finished gasoline and following the main treatment by neutralization of various acidic products with ammonia, the finally rectified gasoline after a light caustic wash may have the properties shown in the column headed "treated gasoline" as compared with a similar boiling range gasoline produced by simple fractionation of the vapors without chemical treatment:

*Comparison of untreated and treated gasoline*

|  | Untreated | Treated |
|---|---|---|
| Gravity ° A.P.I. | 54 | 54.6 |
| End point ° F | 412 | 408 |
| Color—Saybolt | 10 | 30 |
| Color after 4 hours exposure to sunlight | Light yellow | 26 |
| Mgs. gum by copper dish method | 225 | 15 |
| Total sulfur, percent | .30 | .09 |

The above specification and single example of results obtainable by the use of the process will serve to define the novel character of the invention and exemplify its operation and practical value. However, neither the specification nor the figures given in the example are to be considered as imposing undue limitations upon the generally broad scope of the invention.

I claim as my invention:

1. A process for refining the cracked hydrocarbon oil of motor fuel boiling range to remove color and gum forming components and to reduce the sulphur content thereof, which comprises subjecting the hydrocarbon oil while in heated vaporous condition to the action of a mixture of sulphuric and acetic acids.

2. A process for refining the cracked hydrocarbon oil of motor fuel boiling range to remove color and gum forming components and to reduce the sulphur content thereof, which comprises subjecting the hydrocarbon oil while in heated vaporous condition to the action of a solution containing sulphuric and acetic acids.

3. A process for refining the cracked hydrocarbon oil of motor fuel boiling range to remove color and gum forming components and to reduce the sulphur content thereof, which comprises subjecting the hydrocarbon oil while in heated vaporous condition to the action of an aqueous solution containing sulphuric and acetic acids.

JACQUE C. MORRELL.